(12) United States Patent
Xu et al.

(10) Patent No.: US 10,470,149 B2
(45) Date of Patent: *Nov. 5, 2019

(54) METHOD AND APPARATUS FOR PERFORMING MM ATTACH AND SERVICE REQUEST PROCEDURE FOR NETWORK SLICE BASED NEW RADIO ACCESS TECHNOLOGY IN WIRELESS COMMUNICATION SYSTEM

(71) Applicant: LG ELECTRONICS INC., Seoul (KR)

(72) Inventors: Jian Xu, Seoul (KR); Seokjung Kim, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 65 days.

This patent is subject to a terminal disclaimer.

(21) Appl. No.: 15/660,776

(22) Filed: Jul. 26, 2017

(65) Prior Publication Data

US 2018/0035399 A1  Feb. 1, 2018

Related U.S. Application Data

(60) Provisional application No. 62/367,120, filed on Jul. 27, 2016.

(51) Int. Cl.
*H04W 60/04* (2009.01)
*H04W 84/04* (2009.01)
(Continued)

(52) U.S. Cl.
CPC ............ *H04W 60/04* (2013.01); *H04W 4/70* (2018.02); *H04W 8/06* (2013.01); *H04W 48/18* (2013.01); *H04W 76/10* (2018.02); *H04W 84/042* (2013.01)

(58) Field of Classification Search
CPC ....... H04W 48/18; H04W 4/70; H04W 60/04; H04W 76/10; H04W 84/042; H04W 8/06
See application file for complete search history.

(56) References Cited

U.S. PATENT DOCUMENTS 5,845,212 A * 12/1998 Tanaka .................. H04W 52/40
455/437
6,889,050 B1 * 5/2005 Willars ................... H04L 47/10
370/329

(Continued)

OTHER PUBLICATIONS

3rd Generation Partnership Project (3GPP), "Technical Specification Group Services and System Aspects; Study on Architecture for Next Generation System (Release 14)," Section 6.1.3 of of 3GPP TR 23.799 V0.6.0, Jul. 2016, 8 pages.

(Continued)

*Primary Examiner* — Babar Sarwar
(74) *Attorney, Agent, or Firm* — Lee, Hong, Degerman, Kang & Waimey (57) ABSTRACT

When a user equipment (UE) requests a service simultaneously during a mobility management (MM) attach procedure in a new radio access technology (NR; or new RAT) system, slice related information may be transmitted together. In detail, a radio access network (RAN) node receives a network connection request, a service request and slice related information from the UE, and routes the network connection request, the service request to a dedicate common control plane function (C-CPF) according to the slice related information.

18 Claims, 8 Drawing Sheets

(51) Int. Cl.
    *H04W 48/18*     (2009.01)
    *H04W 8/06*     (2009.01)
    *H04W 4/70*     (2018.01)
    *H04W 76/10*     (2018.01)

(56) References Cited

U.S. PATENT DOCUMENTS

| | | | |
|---|---|---|---|
| 9,706,204 B2* | 7/2017 | Song | H04N 19/159 |
| 9,961,624 B1* | 5/2018 | Zait | H04W 48/18 |
| 2016/0352734 A1* | 12/2016 | Senarath | H04L 63/0892 |
| 2017/0079059 A1* | 3/2017 | Li | H04W 16/02 |
| 2017/0142591 A1* | 5/2017 | Vrzic | H04W 24/08 |
| 2017/0331785 A1* | 11/2017 | Xu | H04W 12/08 |
| 2017/0332212 A1* | 11/2017 | Gage | H04W 4/70 |
| 2018/0035399 A1* | 2/2018 | Xu | H04W 4/70 |
| 2018/0249441 A1* | 8/2018 | Ryoo | H04J 11/00 |
| 2018/0352491 A1* | 12/2018 | Shih | H04W 36/14 |
| 2018/0368039 A1* | 12/2018 | Wu | H04W 36/0033 |
| 2019/0021047 A1* | 1/2019 | Zong | H04W 76/11 |

OTHER PUBLICATIONS

3rd Generation Partnership Project (3GPP), "Technical Specification Group Services and System Aspects; Study on Architecture for Next Generation System (Release 14)," Annex B of 3GPP TR 23.799 V0.6.0, Jul. 2016, 4 pages.

* cited by examiner

METHOD AND APPARATUS FOR PERFORMING MM ATTACH AND SERVICE REQUEST PROCEDURE FOR NETWORK SLICE BASED NEW RADIO ACCESS TECHNOLOGY IN WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application No. 62/367,120, filed on Jul. 27, 2016, the contents of which are hereby incorporated by reference herein in its entirety.

BACKGROUND OF THE INVENTION

Field of the Invention

The present invention relates to wireless communications, and more particularly, to a method and apparatus for performing a mobility management (MM) attach and service request procedure for a network slice based new radio access technology (NR or new RAT) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. The NR system may be called another name, e.g. new radio access technology (new RAT). 3GPP has to identify and develop the technology components needed for successfully standardizing the NR timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Initial work for NR should allocate high priority on gaining a common understanding on what is required in terms of radio protocol structure and architecture, with focus on progressing in radio interface protocol architecture and procedures and radio access network architecture, interface protocols and procedures. This work shall cover at least the followings:

Study the feasibility of different options of splitting the architecture into a "central unit (CU)" and a "distributed unit (DU)", with potential interface in between, including transport, configuration and other required functional interactions between these nodes;

Study the alternative solutions with regard to signaling, orchestration . . . and operations, administration and maintenance (OAM), where applicable;

Study and outline the radio access network (RAN)-core network (CN) interface and functional split;

Study and identify the basic structure and operation of realization of RAN networks functions (NFs); Study to what extent it is feasible to standardize RAN NFs, the interfaces of RAN NFs and their interdependency;

Study and identify specification impacts of enabling the realization of network slicing;

Study and identify additional architecture requirements, e.g. support for quality of services (QoS) concept, self-organization network (SON), support of sidelink for device-to-device (D2D).

In the above listed items, features of network slicing should be supported in detail.

SUMMARY OF THE INVENTION

The present invention provides a method and apparatus for performing a mobility management (MM) attach and service request procedure for a network slice based new radio access technology (NR or new RAT) in a wireless communication system. The present invention provides a solution for how a radio access network (RAN) node knows a final selected slice and also a selected common core network control plane (CN CP), in case that a user equipment (UE) requests a service simultaneously during an MM attach procedure.

In an aspect, a method for performing a mobility management (MM) attach and service request procedure by a radio access network (RAN) node in a wireless communication system is provided. The method includes receiving, by the RAN node, a network connection request, a service request and slice related information from a user equipment (UE), and routing, by the RAN node, the network connection request, the service request to a dedicate common control plane function (C-CPF) according to the slice related information.

In another aspect, a radio access network (RAN) node in a wireless communication system is provided. The RAN node includes a memory, and a processor, coupled to the memory, that receives a network connection request, a service request and slice related information from a user equipment (UE), and routes the network connection request, the service request to a dedicate common control plane function (C-CPF) according to the slice related information.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
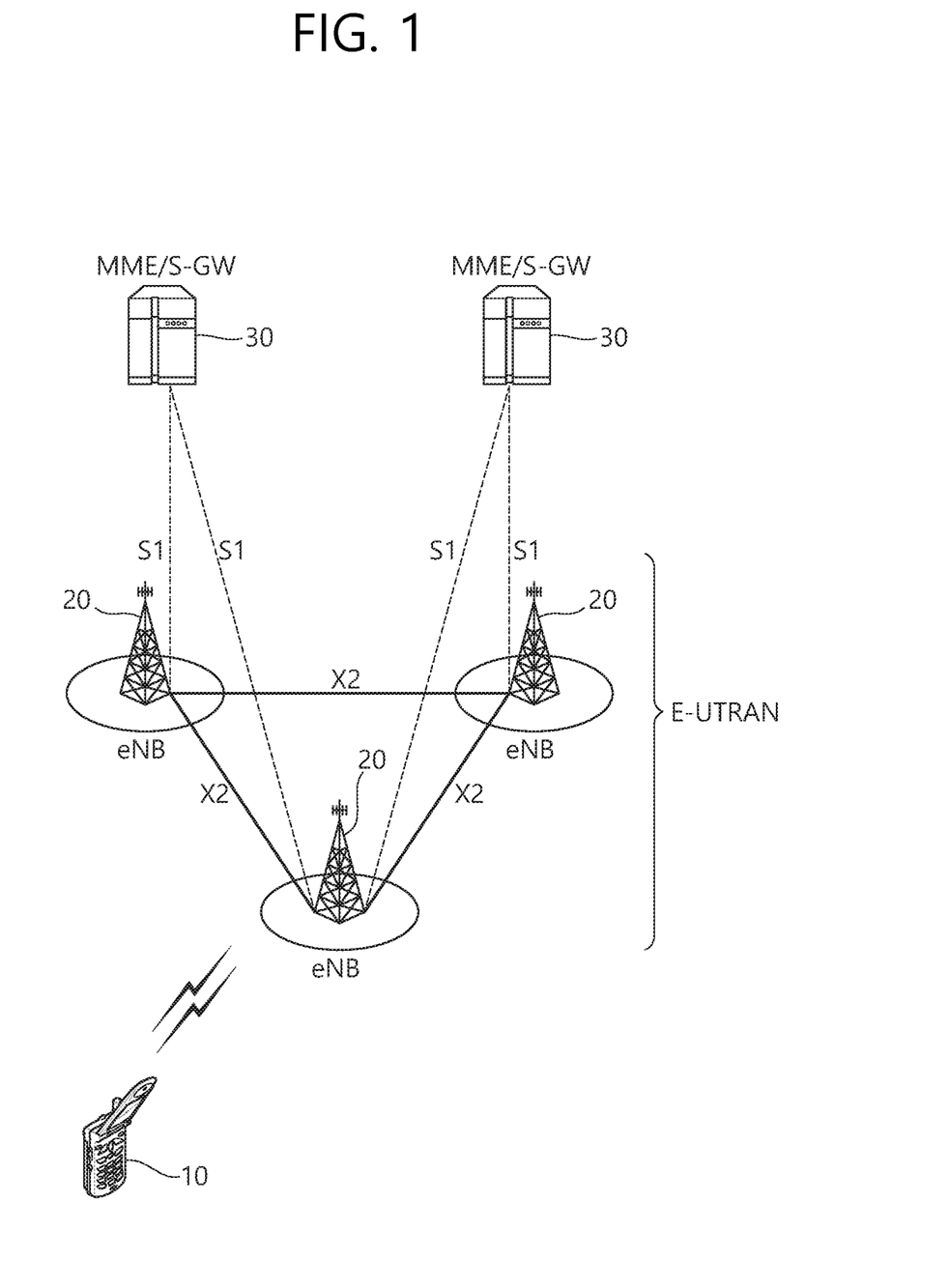
FIG. 1 shows LTE system architecture.

FIG. 1 shows LTE system architecture. Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

5G system is a 3GPP system consisting of 5G access network (AN), 5G core network (CN) and UE. 5G access network is an access network comprising a next generation radio access network (NG-RAN) and/or non-3GPP access network connecting to a 5G core network. NG-RAN is a radio access network that supports one or more of the following options with the common characteristics that it connects to 5G core network:

1) Standalone new radio (NR).
2) NR is the anchor with E-UTRA extensions.
3) Standalone E-UTRA.
4) E-UTRA is the anchor with NR extensions.

As described above, the NR may be included in 5G system. The NR may be called another name, e.g. new radio access technology (new RAT). The NR may be other system than LTE system, and may be used for specific usage, including enhanced mobile broadband (eMBB), massive machine-type-communications (mMTC), ultra-reliable and low latency communications (URLLC), etc.

Network slicing, which is one feature of the NR, is described. It may be referred to as Section 6.1.3 and Annex B of 3GPP TR 23.799 V0.6.0 (2016-07). A network slice is a logical network that provides specific network capabilities and network characteristics. Network slicing enables the operator to create networks customized to provide optimized solutions for different market scenarios which demands diverse requirements, e.g. in the areas of functionality, performance and isolation.

The network slice is implemented via network slice instance(s) (NSI(s)). The network slice instance is a set of network function instances and the required resources (e.g. compute, storage and networking resources) which form a deployed network slice. The network slice instance may be fully or partly, logically and/or physically, isolated from another network slice instance. The resources comprises of physical and logical resources. The network slice instance may be composed of sub-network Instances, which as a special case may be shared by multiple network slice instances. The network slice instance is defined by a network slice blueprint. Instance-specific policies and configurations are required when creating a network slice instance. Network characteristics examples are ultra-low-latency, ultra-reliability, etc.

A network function (NF) is a 3GPP adopted or 3GPP defined processing function in a network, which has defined functional behavior and 3GPP defined interfaces. The network function can be implemented either as a network element on a dedicated hardware, as a software instance running on a dedicated hardware, or as a virtualized function instantiated on an appropriate platform, e.g. on a cloud infrastructure. A NF service is a functionality exposed by a NF through a service based interface and consumed by other authorized NFs. A NF service operation is elementary unit a NF service is composed of.

As one solution for network slicing, to enable a UE to simultaneously obtain services from multiple network slices of one network operator, multiple connections to multiple network slices may be supported.

Figure 2:
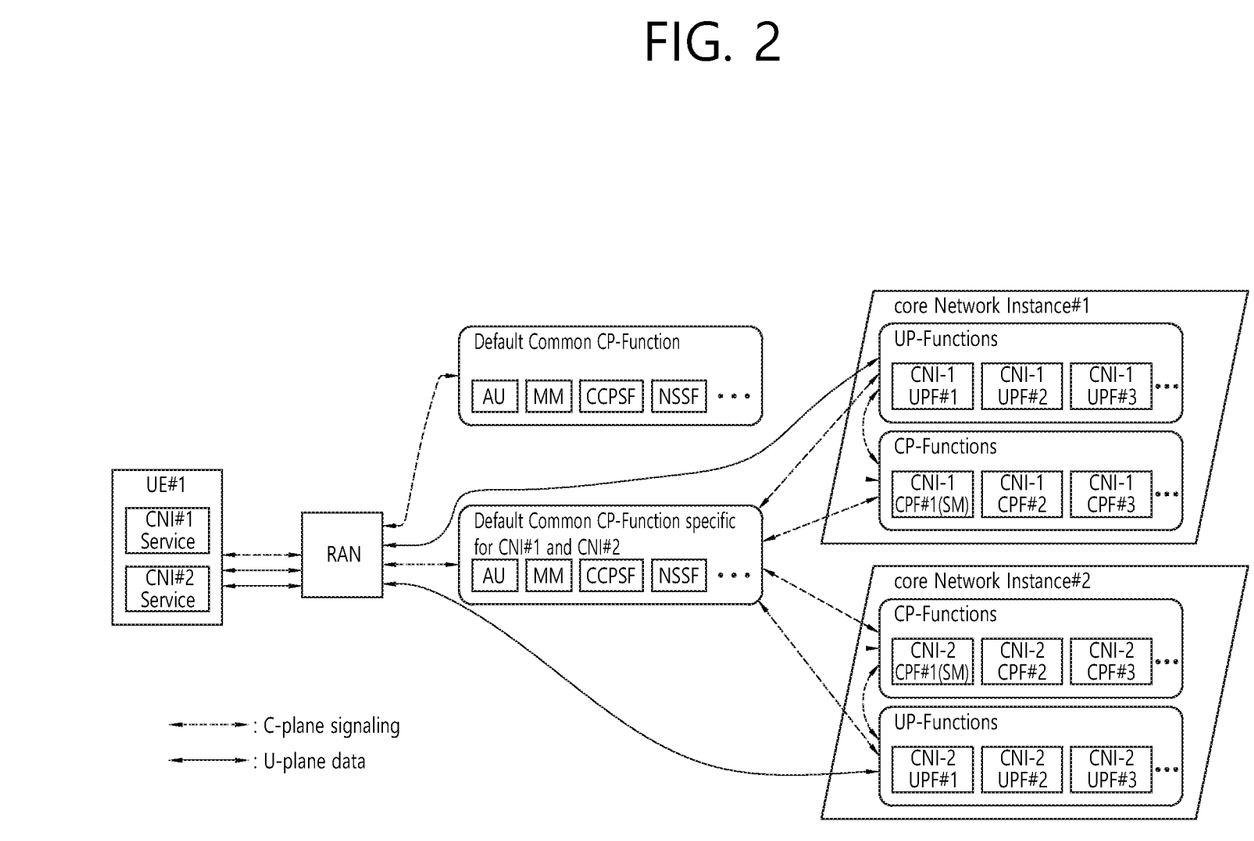
FIG. 2 shows an example of sharing a set of common C-Plane functions among multiples core network instances.

FIG. 2 shows an example of sharing a set of common C-Plane functions among multiples core network instances. Referring to FIG. 2, a single set of control plane (C-Plane) functions that are in common among core network instances is shared across multiple core network instances. Further, other C-Plane functions that are not in common reside in their respective core network instances, and are not shared with other core network instances.

Common C-Plane functions (C-CPF) to multiple core network instances can be:
  Authentication function (AU): AU is responsible for authenticating and authorizing the UE to attach to the operator's network. It also provides security and integrity protection of NAS signaling.
  Mobility management function (MM): MM is responsible for UE registration in the operator's network (e.g. storing of UE context) and UE mobility support (e.g. providing mobility function when UE is moving across base stations within the operator's network).

The C-CPF may be called other names, e.g. access and mobility management function (AMF).

Dedicated C-Plane functions for each core network instances can be:
  Session management function (SM): SM is responsible for protocol data unit (PDU) session establishment, PDU session modification and PDU session termination.

The direct C-Plane interface between RAN and C-Plane functions of core network instance is not needed, since the encrypted NAS signaling message has to be decrypted by a C-CPF, which has exchanged the encrypted key with the UE, for example, the AU function. In case of UE accessing a single core network instance, RAN can have a direct C-Plane interface to the specific C-Plane function located within the core network instance. In such case, those C-Plane functions depicted as a part of C-CPF are considered to be C-Plane functions resided within the core network instance, and hence, there is no C-CPF.

The principles of the solution depicted in FIG. 2 are described as follows:
  A core network instance consists of a single set of C-Plane functions and a single set of U-Plane functions.
  A core network instance is dedicated for the UEs that are belonging to the same UE type. Identifying the UE type is done by using a specific parameter, e.g. the UE Usage Type, and/or an information from the UE's subscription.
  A set of C-Plane functions is responsible, for example, for supporting UE mobility if demanded or for admitting the UE into the network by performing authentication and subscription verification.
  All C-Plane functions that are common to multiple core network instances, are not necessary to be created multiple times.
  Other C-Plane functions that are not in common with other core network instances are only used by its own core network instance.
  A set of U-Plane functions in a core network instance is responsible for providing a specific service to the UE and for transports the U-Plane data of the specific service. For example, one set of U-Plane functions in core network instance#1 provides an eMBB service to the UE, whereas another set of U-Plane functions in core network instance#2 provides a critical communication service to the UE.
  Each UE can have multiple U-Plane connections to different sets of U-Plane function that are available at different core network Instances simultaneously.
  The network slice selection function (NSSF) is responsible for selecting which core network instance to accommodate the UE by taking into account the UE's subscription and the specific parameter, e.g. the UE type, the Service Type or domain network name (DNN) that can be mapped to represent the Service Type that the core network instance supports.
  The RAN communicates with the C-CPF via a single C-Plane interface regardless of which C-Plane function within the C-CPF that the RAN is communicating with. Hence, a C-CPF is considered as a black box.
  The common C-Plane selection function (CCPSF) is considered to be a part of C-CPF, i.e. the CCPSF is assumed to be located in the C-CPF. The CCPSF is responsible for determining which C-CPF that the base station should communicate with. Determination of C-CPF is done by checking with the UE's subscription profile. The CCPSF is not a function to route the NAS signaling message to the right C-CPF. In this solution, it is assumed that the RAN has a function to route the NAS signaling message to a proper C-CPF by taking the information that is sent by the CCPSF in case of the first initial connection request or by the UE in case of any subsequent NAS messages.

Meanwhile, in this solution, the "UE Usage Type", "DCN-ID", "Service Type" and "DNN" are used for the purposes as described below:
  "UE Usage Type" is used for identifying the type of UE, e.g. Car UE Usage Type, Smartphone UE Usage Type.
  "DCN-ID" is used for identifying a dedicate core network that is specific for each UE Usage Type. In addition, an operator may consider to use the DCN-ID to identify specific a dedicate core network for the enterprise of the same UE Usage Type or even for the different variants of dedicated core network. An example for the latter case could be to have different variants of dedicate core network for cellular internet-of-things (CIoT) UEs, i.e. supporting different CIoT optimization features. In other words, DCN-ID is used to determine which C-CPF that is specific for this UE Usage Type and (optionally) for a specific UE enterprise of this UE Usage Type. For instance, one could think of having a dedicate core network for different car enterprises, although they belong to the same type of UE.
  "Service Type" is used for identifying what type of service that the core network instance is supposed to support, e.g. the car UE may want to access multiple core network instances simultaneously that supports eMBB service and vehicle-to-everything (V2X) service.

"Domain Network Name (DNN)" is used for identifying the PDN that a UE wants to communicate with for a certain service type, e.g. DNN#1 for Internet service that requires mobile broadband service.

Temporary UE identity is a temporary identifier provided by the core network to the UE. This is similar to globally unique temporary identifier (GUTI) in evolved packet system (EPS) case. This temporary UE identity consists of two parts: 1) identifier of C-CPF, 2) UE specific identifier.

Taking the above explanation into account, selecting a proper core network instance for the service type that is requested by the UE can be done by using the DNN parameter.

Figure 3:
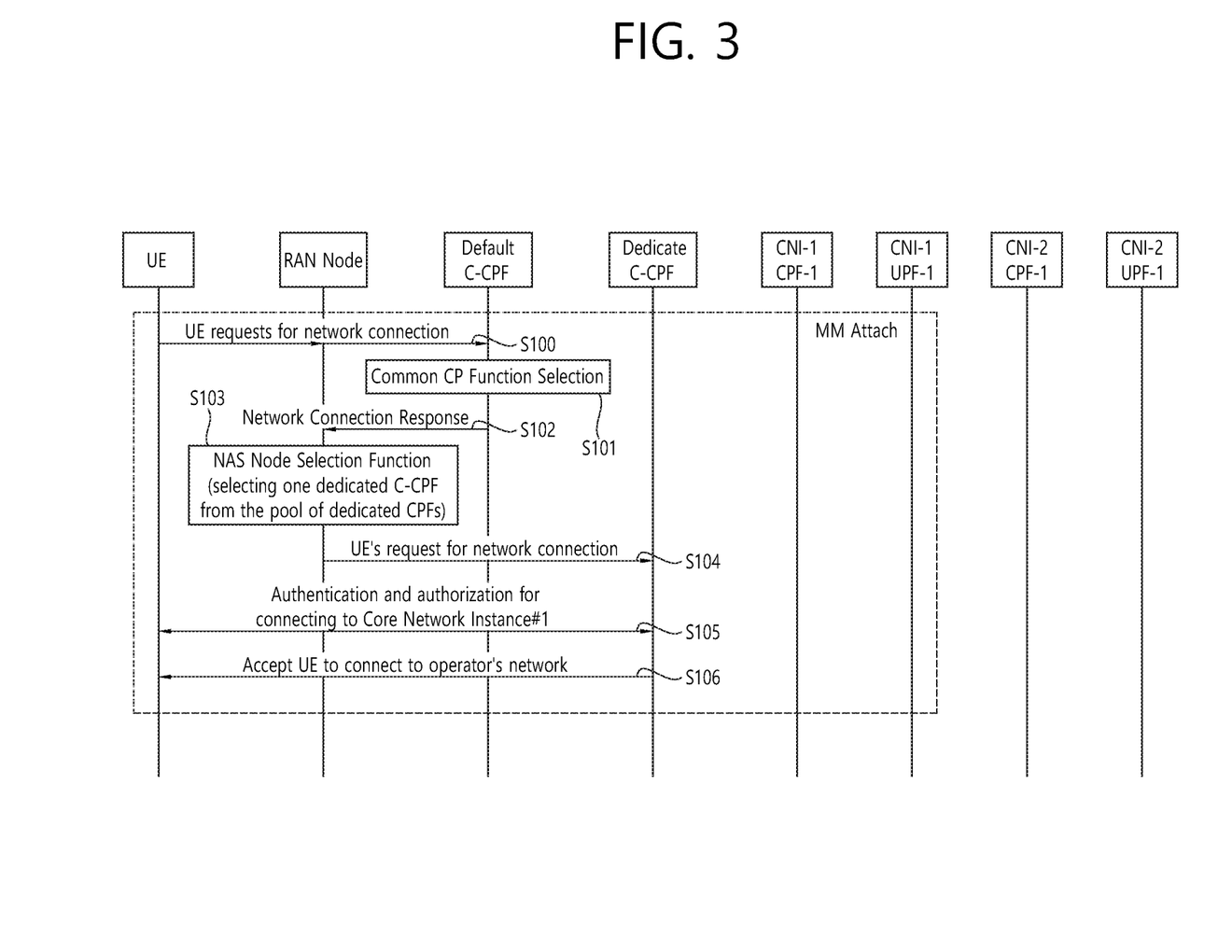
FIG. 3 is a first part of signaling flow for supporting connections with multiple core network instances.

FIG. 3 is a first part of signaling flow for supporting connections with multiple core network instances. FIG. 3 shows an MM attach procedure for supporting connections with multiple core network instances.

In step S100, when a UE first connects to the operator's network or registers to the public land mobile network (PLMN) for the first time and there is no sufficient information for the RAN to route this network connection request to an appropriate C-CPF, the UE sends a network connection request to the RAN, which is then further forwarded to the default C-CPF. The flow continues in step S101, which will be described below.

If the UE provides the DCN-ID along with this network connection request, but does not provide a Temporary UE identity, the RAN uses this DCN-ID to determine an appropriate C-CPF that supports this DCN-ID, and the flow continues in step S103, which will be described below. In addition, the UE may provide other information, e.g. Service Type and/or DNN along with this network connection request.

If the UE provides the Temporary UE identity, the RAN uses the Temporary UE identity to determine a dedicate C-CPF and, the flow continues in step S103, which will be described below. In addition, the UE may provide other information, e.g. DCN-ID, Service Type and/or DNN along with this network connection request.

When the UE sends a request to connect to an operator's network, a UE may request to establish a session for a particular service by sending the DNN along with this network connection request. If this is the case, after the authentication and authorization in step S105, which will be described below, has been performed, the dedicate c-CPF will establish the session for the request service like similar to steps S111, S112 and S113, which will be described below in FIG. 4.

In step S101, the CCPSF located in the default C-CPF determines which C-CPF to be connected to by taking into account information in the network connection request from a UE in step S100, e.g. DCN-ID. In addition, other information from the subscription database may be also considered. For example, the UE's subscription may indicate that for this UE, the operator should set up a session with the subscribed core network instance. In FIG. 3, this is the core network instance #1.

In case, the default C-CPF determines that it will serve this UE's network connection request, it either continues with the authentication and admitting the UE to attach/connect to operator's network or reject this UE's network connection request and hence this procedure ends in this step. This specific case is not depicted in FIG. 3 for simplicity of the signaling flow.

In step S102, the default C-CPF sends a response to the RAN node with the C-CPF for the UE to attach. Same content of UE's network connection request in step S100 is also sent back to the RAN.

If the UE provides a Temporary UE identity, this means that the UE has been once registered at the PLMN, and the core network has decided to which DCN-ID the UE should be connected. Hence, the RAN uses only the Temporary UE identity to route the NAS message to the appropriate C-CPF.

In step S103, in case there is a pool of C-CPFs that are dedicated for this UE Usage Type and/or for this DCN-ID provided by the UE or by the default C-CPF in step S102, the RAN node performs NAS node selection function (NNSF).

In step S104, the RAN node routes the UE's network connection request to the dedicate C-CPF. Along with this request, it may contain other information like the DNN to enable the dedicate C-CPF to select a core network instance that is specific for a certain Service Type.

In step S105, authentication and admitting the UE to attach/connect to operator's network is performed. In this step, the key for decrypting NAS message between the UE and the dedicate C-CPF is also provided.

In step S106, the dedicated C-CPF sends a network connection accept response to the UE. In this response, it contains the Temporary UE identity and the information, for which the UE is to be configured, e.g. which DCN-ID, its corresponding Service Type and/or corresponding DNN that the UE is allowed to connect. In case, the DCN-ID newly provided does not match to the ones that the UE already has, the DCN-ID(s) will be configured at the UE.

Figure 4:
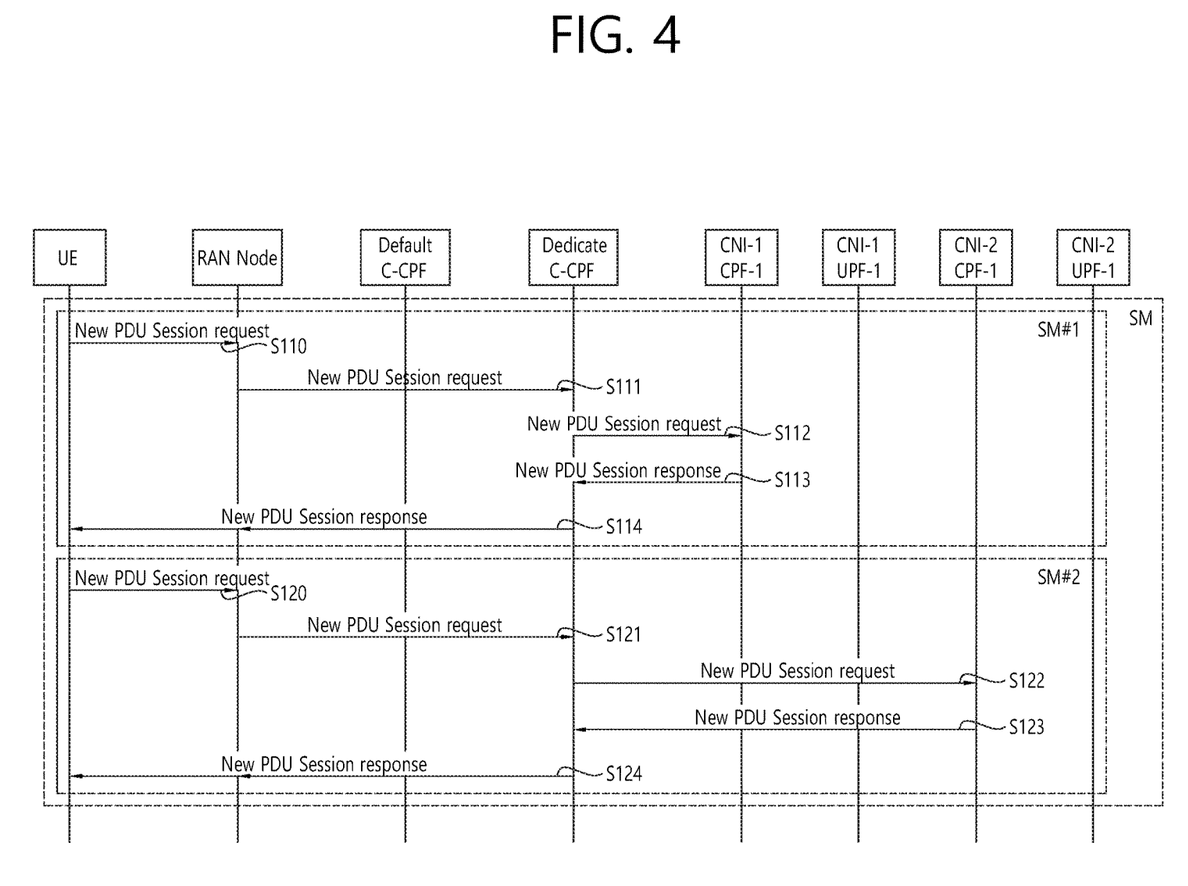
FIG. 4 is a second part of signaling flow for supporting connections with multiple core network instances.

FIG. 4 is a second part of signaling flow for supporting connections with multiple core network instances. The signaling flow of FIG. 4 follows the signaling flow of FIG. 3. FIG. 4 shows an SM procedure for supporting connections with multiple core network instances.

In step S110, the UE requests for establishment of a session for a communication service (e.g. service #1 that is provided by the core network instance #1) by sending an SM request for a new PDU session. In this PDU session request, the UE provides the DCN-ID and DNN.

In step S111, the RAN forwards the PDU session request to an appropriate dedicated C-CPF by using the DCN-ID information sent by the UE.

In step S112, the dedicated C-CPF selects CPF of the core network instance #1 by using the DNN information in the PDU session request, and forwards the UE's PDU session request for the service #1 to the CPF-1 in core network instance #1 (i.e. CNI-1 CPF-1), which is responsible for session management in CNI #1. This forwarded PDU session request still contains the information that has been sent by the UE such as the UE Usage Type, DCN-ID and DNN.

In step S113, after a successful session establishment, the CPF-1 in core network instance #1 sends the session response back to the dedicated C-CPF.

In step s114, the dedicated C-CPF sends a new service response back to the UE via the RAN.

In step S120, the UE requests for establishment another session for a new communication service that is of a different service type than the previous service. In this PDU session request, the UE provides the Temporary UE identity, UE Usage Type, DCN-ID, and Service Type and/or DNN.

In step S121, the RAN determines the dedicate C-CPF by using the Temporary UE identity sent by the UE and forwards the PDU session request to the dedicated C-CPF.

In step S122, the dedicated C-CPF selects CPF of the core network instance #2 by using the DNN information in the PDU session request, and forwards the UE's service request for the new service to the CPF-1 in core network instance#2 (i.e. CNI-2 CPF-1), which is responsible for session management in CNI #2. This forwarded PDU session request still contains the information that has been sent by the UE such as the UE Usage Type, DCN-ID, and Service Type and/or DNN.

In step S123, after a successful session establishment, the CPF-1 in core network instance #2 sends the session response back to the dedicated C-CPF.

In step S124, the dedicated C-CPF sends a new service response back to the UE via the RAN.

Meanwhile, for other similar candidate architecture, a multi-dimensional descriptor (MDD) may be additionally defined. The MDD may identify a slice. The MDD may be provided by the UE in both the RRC and the NAS signaling layers. For each slice the UE can access, the MDD may consist of at least a tenant ID which identifies a tenant, and a service descriptor/slice type which identifies the network behaviors. The tenant ID is used by an operator to lease a portion of its network infrastructure to a specific vendor. The service descriptor/slice type may correspond to e.g. eMBB service, critical communication, mMTC or other behaviors.

If a UE requests the service simultaneously during the MM attach procedure, a problem of how to let the RAN node knows the final selected slice and also the selected C-CPF may need to be addressed.

In order to solve the problem described above, the present invention provides a method for performing MM attach and service request procedure according to an embodiment of the present invention.

Figure 5:
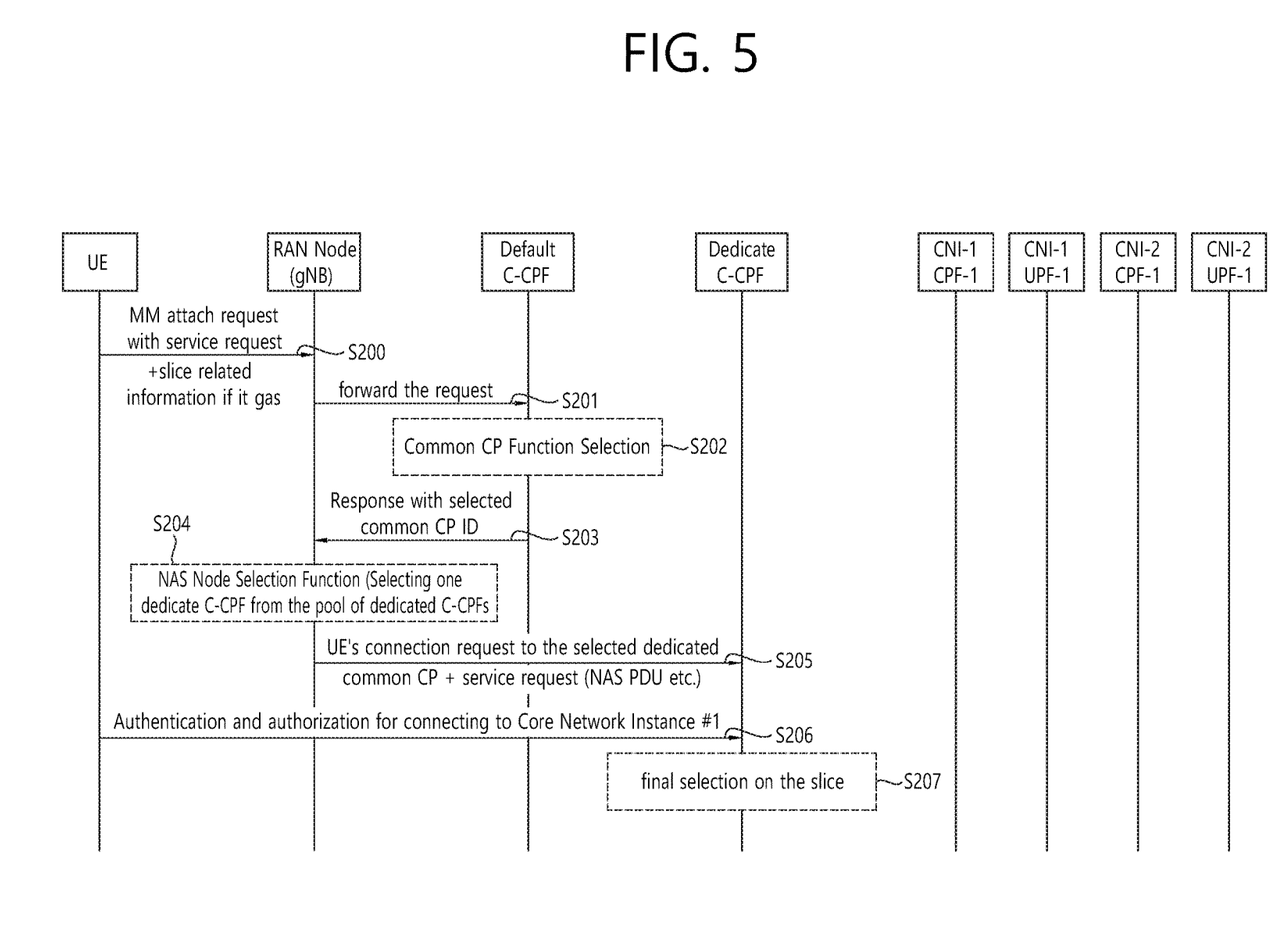
FIG. 5 shows a first part of a method for performing MM attach and service request procedure according to an embodiment of the present invention.

FIG. 5 shows a first part of a method for performing MM attach and service request procedure according to an embodiment of the present invention.

In step S200, the UE transmits a MM attach request (or, network connection request) with a service request to the RAN node, e.g. gNodeB (gNB). That is, when the UE sends a request to connect to an operator's network, a UE may request to establish a session for a particular service. Further, the UE may transmit slice related information to the RAN node if it has.

If a UE first connects to the operator's network or registers to the PLMN for the first time and there is no sufficient information for the RAN to route this network connection request to an appropriate C-CPF, the UE sends a network connection request to the RAN, which is then further forwarded to the default C-CPF. The flow continues in step S202, which will be described below.

If the UE provides the C-CPF ID (e.g. DCN-ID, MDD ID) along with this network connection request, but does not provide a Temporary UE identity, the RAN uses this C-CPF ID to determine an appropriate C-CPF that supports this C-CPF ID, and the flow continues in step S204, which will be described below. In addition, the UE may provide other information, e.g. Service Type and/or DNN along with this network connection request.

If the UE provides the Temporary UE identity, the RAN uses the Temporary UE identity to determine a dedicate C-CPF and, the flow continues in step S204, which will be described below. In addition, the UE may provide other information, e.g. DCN-ID, Service Type and/or DNN along with this network connection request.

In step S201, the MM attach request and the service request received from the UE are forwarded to the default C-CPF.

In step S202, the default C-CPF selects a C-CPF for the UE based on the subscription information of the UE.

In step S203, the default C-CPF transmits a response message to the RAN node with the C-CPF for the UE to attach.

In step S204, if the UE provides a Temporary UE identity, this means that the UE has been once registered at the PLMN, and the core network has decided to which C-CPF ID (e.g. DCN-ID, MDD ID) the UE should be connected. Hence, the RAN uses only the Temporary UE identity to route the NAS message to the appropriate C-CPF.

In case there is a pool of C-CPFs that are dedicated for this UE Usage Type and/or for this DCN-ID/MDD ID provided by the UE or by the default C-CPF in step S203, the RAN node performs NAS node selection function (NNSF).

In step S205, the RAN node routes the UE's network connection request to the dedicate C-CPF together the service request (NAS PDU, etc.).

In step S206, authentication and admitting the UE to attach/connect to operator's network is performed.

In step S207, the dedicate C-CPF determines the final network slice (e.g. CNI, DNN) to be used for this service, based on the information configured or obtained from the core network instances or some information from the UE report if it exists.

Figure 6:
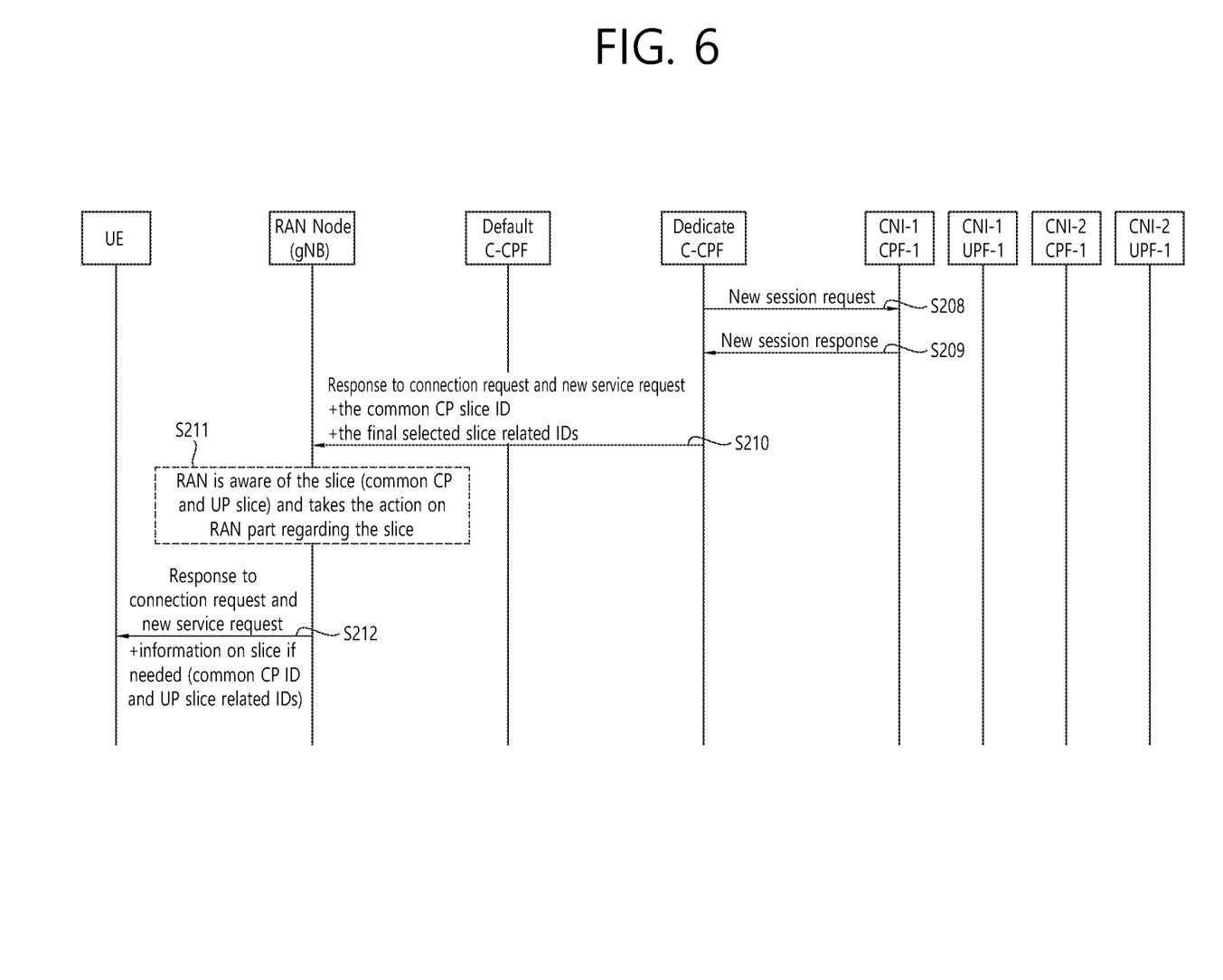
FIG. 6 shows a second part of a method for performing MM attach and service request procedure according to an embodiment of the present invention.

FIG. 6 shows a second part of a method for performing MM attach and service request procedure according to an embodiment of the present invention. The signaling flow of FIG. 6 follows the signaling flow of FIG. 5.

In step S208, the dedicate C-CPF transmits a session request to the corresponding selected core network instance. In this embodiment, the selected core network instance is CNI #1.

In step S209, after a successful session establishment, the CPF-1 in CNI #1 transmits a session response back to the dedicate C-CPF, together with DNN ID.

In step S210, the dedicate C-CPF transmits a response to the network connection request and the new service request to the RAN node. The response message may include at least one of the followings:
  C-CPF ID, e.g. DCN-ID/MDD ID, which may be used by UE/RAN node in the subsequent service request for helping the selection.
  Final selected slice related ID, e.g. CNI ID, DNN ID, Tenant ID, slice type ID, etc.

In step S211, upon receiving the response message including information on slice from the dedicate C-CPF, the RAN node can aware of the final selected slice (C-CPF ID and UP slice related IDs). Accordingly, the RAN node may take the corresponding action for this slice from point of view of the RAN node.

In step S212, the RAN node gives response back to the UE about the network connection request and the service request, together with information on slice (C-CPF ID and UP slice related IDs). The UE may use the information on slice for the future session request.

Figure 7:
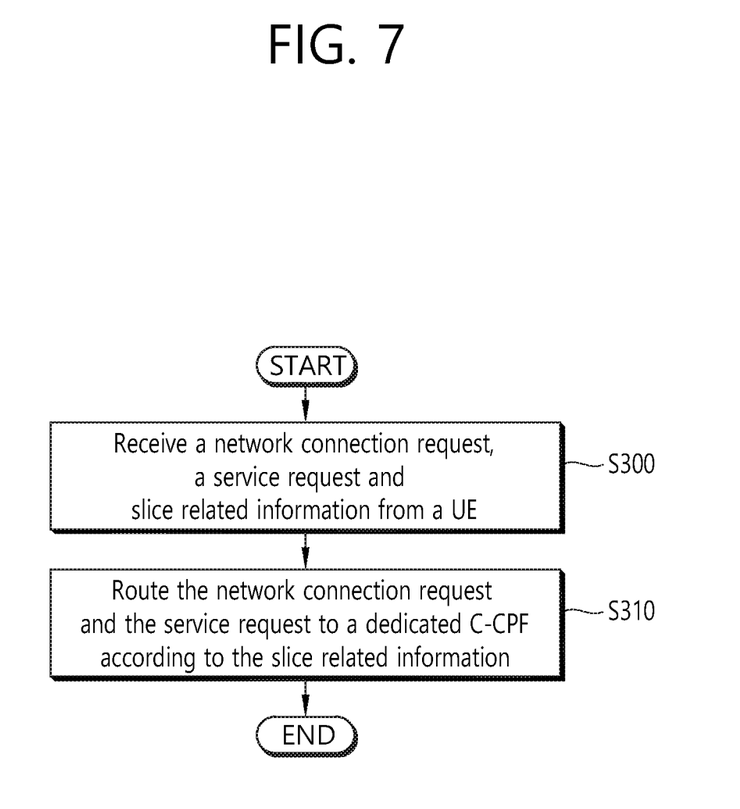
FIG. 7 shows a method for performing a MM attach and service request procedure by a RAN node according to an embodiment of the present invention.

FIG. 7 shows a method for performing a MM attach and service request procedure by a RAN node according to an embodiment of the present invention. The present invention described above may be applied to this embodiment.

In step S310, the RAN node receives a network connection request, a service request and slice related information from a UE. The slice related information may correspond to a MDD ID. The MDD ID may consist of a tenant ID and a slice type. The tenant ID may identify a tenant to which an operator leases its network infrastructure. The slice type may identify a network behavior.

The RAN node may determine a dedicate C-CPF by using the MDD ID. The RAN node routes the network connection request, the service request to the dedicate C-CPF according to the slice related information.

The RAN node may further receive a first response to the network connection request and the service request from the dedicate C-CPF. The first response may include a C-CPF ID and a final selected slide related ID. The C-CPF ID may include at least one of a DCN ID or a MDD ID. The final selected slice related ID may include at least one of a CNI ID, a DNN ID, a tenant ID, or a slice type ID. The RAN node may further transmitting a second response to the network connection request and the service request to the UE. The second response may include a C-CPF ID and a final selected slide related ID.

Figure 8:
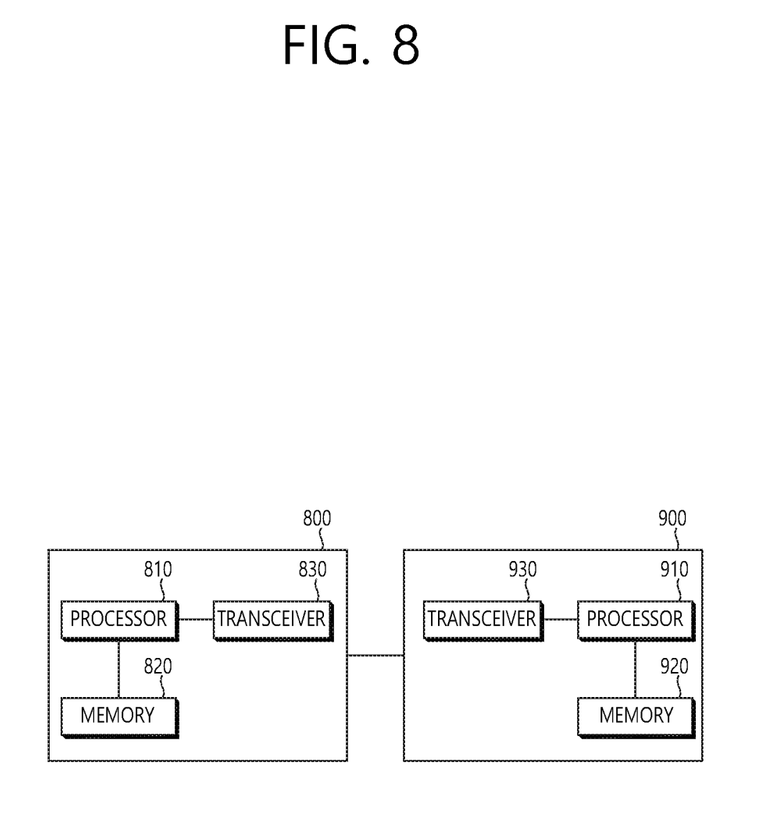
FIG. 8 shows a communication system to implement an embodiment of the present invention.

FIG. 8 shows a communication system to implement an embodiment of the present invention.

A first network 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A second network node 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, a network can authorize a network slice that a UE has requested for a service.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing a mobility management (MM) attach and service request procedure by a radio access network (RAN) node in a wireless communication system, the method comprising:
   receiving, by the RAN node, a network connection request, a service request and slice related information from a user equipment (UE);
   determining a dedicate common control plane function (C-CPF) based on the slice related information; and
   routing, by the RAN node, the network connection, request and the service request to the determined dedicate C-CPF.

2. The method of claim 1, wherein the slice related information corresponds to a multi-dimensional descriptor (MDD) identifier (ID).

3. The method of claim 2, wherein the MDD ID consists of a tenant ID and a slice type.

4. The method of claim 3, wherein the tenant ID identifies a tenant to which an operator leases its network infrastructure.

5. The method of claim 3, wherein the slice type identifies a network behavior.

6. The method of claim 1, further comprising receiving a first response to the network connection request and the service request from the dedicate C-CPF,
   wherein the first response includes a C-CPF ID and a final selected slide related ID.

7. The method of claim 6, wherein the C-CPF ID includes at least one of a dedicate core network (DCN) ID or a multi-dimensional descriptor (MDD) ID.

8. The method of claim 6, wherein the final selected slice related ID includes at least one of a core network instance (CNI) ID, a domain network name (DNN) ID, a tenant ID, or a slice type ID.

9. The method of claim 6, further comprising transmitting a second response to the network connection request and the service request to the UE,
   wherein the second response includes a C-CPF ID and a final selected slide related ID.

10. A radio access network (RAN) node in a wireless communication system, the RAN node comprising:
    a memory; and
    a processor, coupled to the memory, that:
    receives a network connection request, a service request and slice related information from a user equipment (UE);
    determines a dedicate common control plane function (C-CPF) based on the slice related information; and
    routes the network connection, request and the service request to the determined dedicate C-CPF.

11. The RAN node of claim 10, wherein the slice related information corresponds to a multi-dimensional descriptor (MDD) identifier (ID).

12. The RAN node of claim 11, wherein the MDD ID consists of a tenant ID and a slice type.

13. The RAN node of claim 12, wherein the tenant ID identifies a tenant to which an operator leases its network infrastructure.

14. The RAN node of claim 12, wherein the slice type identifies a network behavior.

15. The RAN node of claim 10, wherein the processor further receives a first response to the network connection request and the service request from the dedicate C-CPF, wherein the first response includes a C-CPF ID and a final selected slide related ID.

16. The RAN node of claim 15, wherein the C-CPF ID includes at least one of a dedicate core network (DCN) ID or a multi-dimensional descriptor (MDD) ID.

17. The RAN node of claim 15, wherein the final selected slice related ID includes at least one of a core network instance (CNI) ID, a domain network name (DNN) ID, a tenant ID, or a slice type ID.

18. The RAN node of claim 15, wherein the processor further transmits a second response to the network connection request and the service request to the UE,
    wherein the second response includes a C-CPF ID and a final selected slide related ID.

* * * * *